United States Patent [19]
Merkin

[11] Patent Number: 5,812,390
[45] Date of Patent: Sep. 22, 1998

[54] APPARATUS AND METHOD FOR MESSAGE VARIABLE REORDERING

[75] Inventor: Cynthia M. Merkin, Georgetown, Tex.

[73] Assignee: Dell USA, L.P., Round Rock, Tex.

[21] Appl. No.: 508,855

[22] Filed: Jul. 28, 1995

[51] Int. Cl.$^6$ .................................................. H02M 7/537
[52] U.S. Cl. ............................................ 364/131; 364/132
[58] Field of Search ..................................... 364/131, 132, 364/464, 464.02

[56] References Cited

U.S. PATENT DOCUMENTS

| | | | |
|---|---|---|---|
| 5,121,391 | 6/1992 | Paneth et al. | 370/95.1 |
| 5,517,556 | 5/1996 | Pounds et al. | 379/67 |
| 5,555,183 | 9/1996 | Willard et al. | 340/825.21 |

OTHER PUBLICATIONS

F.W. Crigger, J.B. Schueler, and J.W. Welch, "Watcom C Library Reference", 4th Edition ©1992, 344–348.

*Primary Examiner*—Paul P. Gordon
*Assistant Examiner*—McDieunel Marc
*Attorney, Agent, or Firm*—Skjerven, Morrill, MacPherson, Franklin & Friel, L.L.P.; Stephen A. Terrile; Mark P. Kahler

[57] ABSTRACT

A portable computer is provided in which message variable values provided for user messages can be readily reordered when different versions of the computer are produced to support respective languages. The computer includes a basic input/output system software (BIOS) having a caller routine that initiates issuance of a user message by passing message variable values and a message token to a separate message handler routine within the BIOS. The message token designates the selection of one of a plurality of message strings stored within a message storage area in the BIOS. The message strings stored in the message storage area include fixed text portions and message variables. The message storage area is separate from the caller routine. The caller routine passes message variable values in a fixed order to the message handler routine. The message handler routine scans the particular message string designated by the message token and determines the order of the variable values to be output to the user from order information contained within the message string itself. The message handler appropriately reorders the message variable values placed amongst the fixed text portions of the final message outputted to the user if the order information in the message string so instructs.

33 Claims, 4 Drawing Sheets

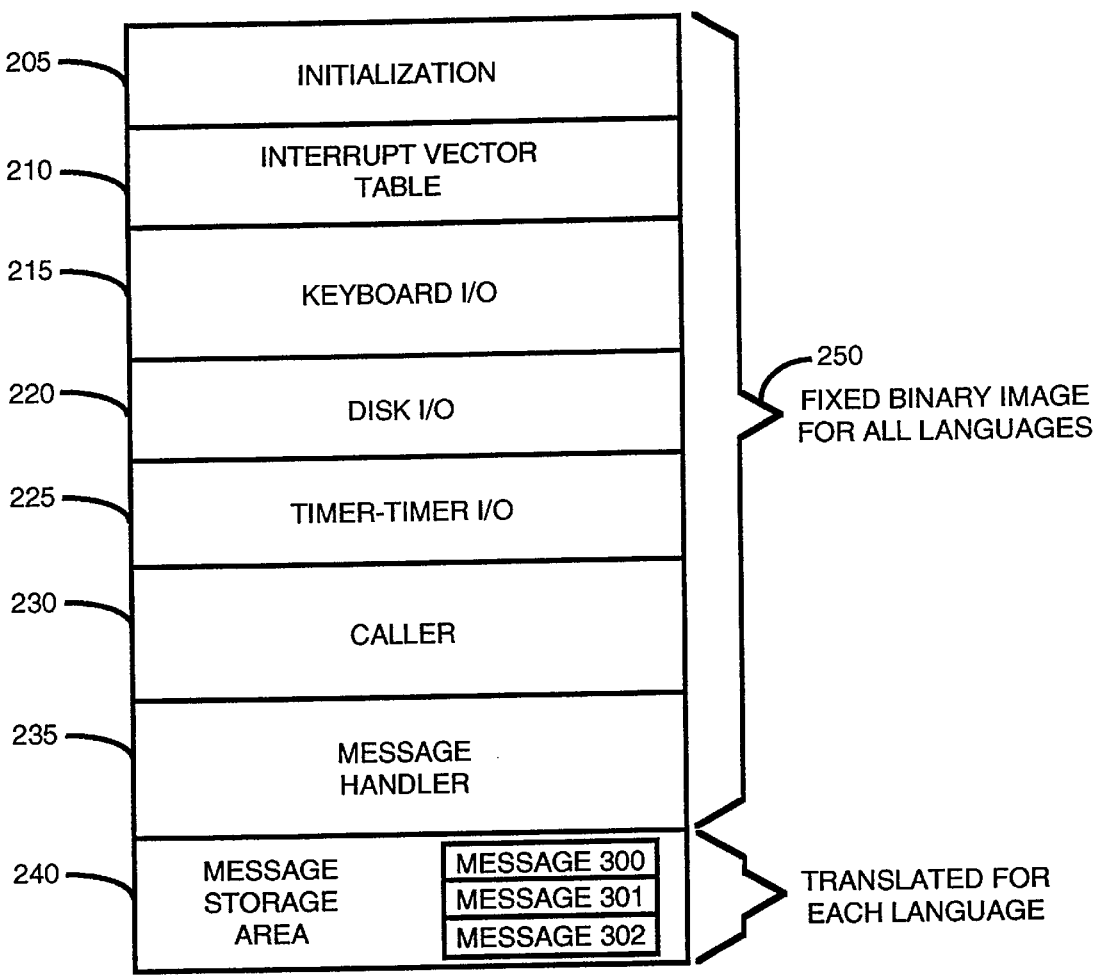

FIG. 3A
300
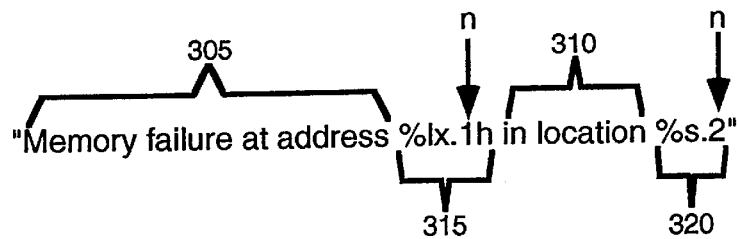
FIG. 3B
- START VARIABLE
- DESCRIPTOR 325
- SEPARATOR 330
- VARIABLE NUMBER 335
| %s.n | Variable n is a pointer to a zero-terminated string. |
|---|---|
| %c.n | Variable n is a single character. |
| %u.n | Variable n is an unsigned decimal integer (2 byte value). |
| %x.n | Variable n is a 2 byte value to be printed in hex. |
| %lx.n | Variable n is a 4 byte (long) value to be printed in hex. |
FIG. 3C
400
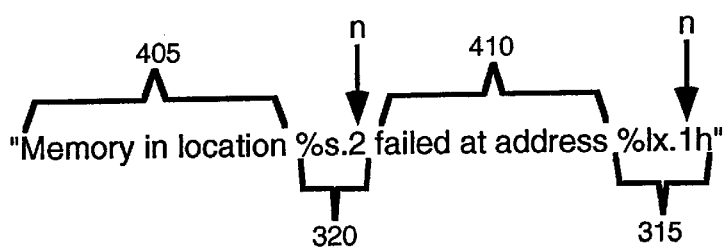

APPARATUS AND METHOD FOR MESSAGE VARIABLE REORDERING

BACKGROUND OF THE INVENTION

1. Field of the Invention

This invention relates in general to computer systems and, more particularly, to computer systems which require message translation to create different versions of the computer system for different languages.

2. Description of Related Art

Personal computer systems in general and IBM compatible personal computer systems in particular have attained widespread use. These personal computer systems now provide computing power to many segments of today's modern society. A personal computer system can usually be defined as a desktop, floor-standing, or portable microcomputer that includes a system unit having a system processor with associated volatile and non-volatile memory, a display monitor, a keyboard, one or more floppy diskette drives, a hard disk storage device and an optional printer. One of the distinguishing characteristics of these systems is the use of a system board or motherboard to electrically connect these components together. These personal computer systems are information handling systems which are designed primarily to give independent computing power to a single user (or a relatively small group of users in the case of personal computers which serve as server systems). Such personal computer systems are generally inexpensively priced for purchase by individuals or small businesses. A personal computer system may also include one or a plurality of I/O devices (i.e. peripheral devices) which are coupled to the system processor and which perform specialized functions. Examples of I/O devices include modems, sound and video devices or specialized communication devices.

Personal computer systems typically include basic input/output system (BIOS) microcode to make programmer/user interaction with the system hardware easier. More specifically, BIOS is a microcode software interface between the system hardware and the operating system/application program. The operating system and application program access BIOS rather than directly manipulating I/O ports, registers and control words of the specific system hardware. BIOS is accessed through an interface of software interrupts and contains a plurality of entry points corresponding respectively to the different interrupts. In operation, BIOS is typically loaded from a BIOS ROM in which it is stored into a main system memory from which it is executed. This practice is referred to as "shadow RAM" and increases the perceived speed at which BIOS executes.

While the computer operates, the BIOS code often causes messages to be displayed to inform the user about system status, to inform the user with respect to the occurrence of a particular event, or to provide the user with other information. Such a message can include both a fixed textual portion and variable data. For example, the computer can issue a U.S. English language message "Date: Jul. 1, 1995" which informs the user as to the date. In this particular message the word "Date:" is the fixed textual portion of the message and the information "Jul. 1, 1995" is the variable portion of the message (ie. the date variable). In the United States, as in the case just discussed above, the date variable is typically presented in the format mm/dd/yy wherein "mm" specifies the digits of the month, "dd" specifies the digits of the day and "yy" specifies the digits of the year.

Messages issued to the user by the BIOS typically are embedded directly in the BIOS source code which is stored in the BIOS ROM. The BIOS source code thus has full control over the combination of the fixed textual portion and any variable data that might accompany the fixed textual portion. In designing a computer system for worldwide distribution, the textual portion of the message is translated into languages other that U.S. English to provide a computer system adapted to the language of a particular country. While the date format "mm/dd/yy" is common in the U.S., the date format "dd/mm/yy" is common in Europe. In this example, a problem is thus encountered in designing versions of computer systems for foreign distribution since not only must the fixed textual portion be translated, but also reordering of the variables mm, dd and yy is required. It is thus seen that when the message is translated, it is possible that the location and order of the message variables may no longer be the same as the U.S. English version.

One solution to this problem is to write a specific version of the BIOS for each language. A plurality of different, language-specific BIOS's are thus created in which each BIOS re-orders the message variables according to the needs of the particular language. In this approach, the variable reordering is performed within the BIOS code itself. The translation of the fixed textual portion is also done within the BIOS itself for each language version. Unfortunately, this approach is very expensive since a different version of the BIOS and BIOS ROM must be provided for each foreign language which is supported.

It is known that PS/2 computers manufactured by the International Business Machines Corporation employ BIOS microcode which separates language-specific messages from the routines which issue these messages. This method is more cost effective than the approach wherein the language specific messages are imbedded in the BIOS source code. However, this method does not account for the fact that message variables in non-U.S. English messages may not have the same order as in U.S. English messages.

It is noted that conventional C language includes a "printf string" feature wherein message variable formatting is specified within the message. However, the printf function of C language requires that the parameters be passed in the same order as used in the message.

SUMMARY OF THE INVENTION

A computer system was discovered with a message variable value reordering capability which makes it significantly easier to provide versions of the computer system for different languages. More particularly, one embodiment of the computer system is disclosed which includes a processor and a main memory coupled to the processor. The computer system includes a message storage area for storing a message string including a fixed text portion and a plurality of message variables with order information. The computer system also includes a caller module for supplying message variable values when a predetermined condition occurs. The system further includes a message handler module for receiving message variable values from the caller module. The message handler module retrieves the message string from the message storage area as a retrieved message string. The message handler module also reorders the message variable values if instructed by the order information of the retrieved message string. The computer system further includes an output device responsive to the message handler module for providing output to the message variable values from the message handler module combined with the fixed text portion of the retrieved message string.

In accordance with another embodiment of the present invention, a computer system is provided which includes a processor and a main memory coupled to the processor. The computer system includes a message storage area for storing a plurality of message strings, each message string including a plurality of fixed text portions and a plurality of message variables with message variable order information. The computer system also includes a caller module for determining if a predetermined condition occurs and in response supplying a token and a plurality of message variable values in a fixed order. The token designates one of the message strings in the message storage area as a designated message string. The computer system further includes a message handler module for receiving the token and the plurality of message variable values supplied by the caller module. The message handler module retrieves the designated message string from the message storage area and reorders the message variable values if instructed by the message variable order information of the designated message string. The computer system also includes an output device responsive to the message handler module for providing output to the message variable values from the message handler module combined with the fixed text portions of the designated message string.

A computer system is thus provided which is readily adaptable to create versions for different languages wherein message variable values are reordered.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

FIG. 2 is a diagram representing several of the modules or routines in the BIOS code employed in the computer system of FIG. 1.

FIG. 3A is a representative message string stored in the message area in the BIOS code of the computer system of FIG. 1.

FIG. 3B is a chart which shows different types of variables that can be employed in a message which is displayed by the computer system.

FIG. 3C is a representative message string stored in the message area in the BIOS code wherein the message string reorders the variables which are supplied by the caller to the message handler.

DETAILED DESCRIPTION OF THE INVENTION

Figure 1:
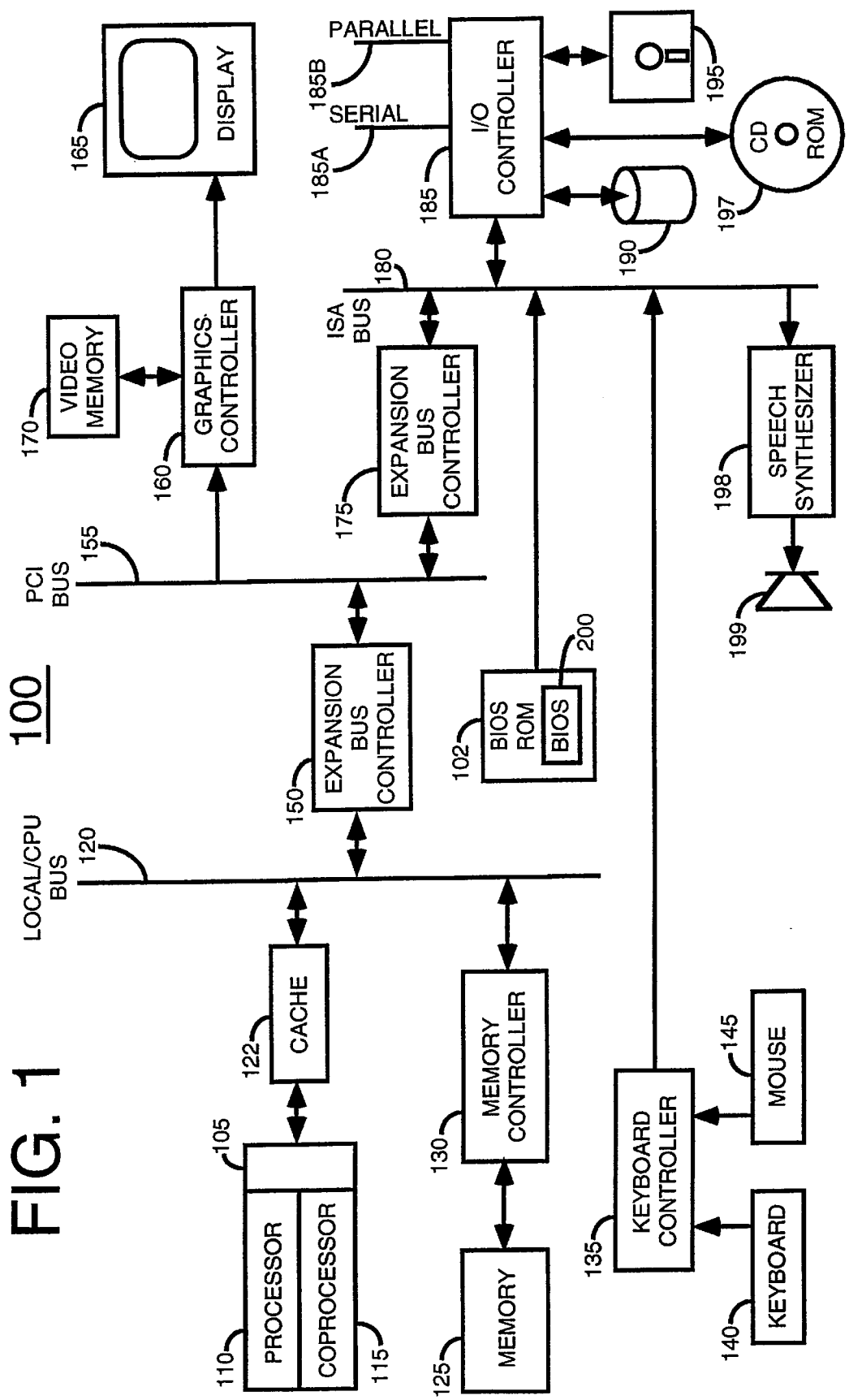
FIG. 1 is a block diagram of the disclosed computer system.

FIG. 1 is a block diagram of a computer 100 which includes basic input/output system software (BIOS) 200 stored in a BIOS ROM 102. BIOS ROM 102 provides nonvolatile storage to BIOS 200. BIOS 200 includes a caller routine that initiates issuance of a message by passing message variable values and a message token to a separate message handler routine within the BIOS. The message token designates one of a plurality of message strings stored within a message storage area in the BIOS. The message strings stored in the message storage area include fixed text portions and message variables. The message storage area is separate from the caller routine. The caller routine passes variables in a fixed order to the message handler routine. The message handler routine scans the particular message string designated by the message token and determines the order of the message variable values to be output to the user from string information contained within the message string itself. The message handler appropriately reorders the message variable values placed amongst the fixed text portions of the final message outputted to the user if the message string so instructs. The caller routine, handler routine and the message storage area will be discussed later in more detail.

The computer 100 in which BIOS 200 is employed is now be described. Computer 100 includes a microprocessor 105 having a processor 110 for handling integer operations and a coprocessor 115 for handling floating point operations. Microprocessor 105 is coupled to a local bus 120 via cache 122. A main memory 125 of dynamic random access memory (DRAM) modules is coupled to local bus 120 by a memory controller 130.

A bus interface controller or expansion bus controller 150 couples local bus 120 to an expansion bus 155. In this particular embodiment, expansion bus 155 is a Peripheral Component Interconnect (PCI) bus. A graphics controller 160 couples a display 165 to expansion bus 155 to permit display of graphics images including messages to the user. A video memory 170 is coupled to graphics controller 160 to facilitate display of graphics images on display 165.

A bus interface controller or expansion bus controller 175 couples PCI expansion bus 155 to an expansion bus 180. Expansion bus 180 is an industry standard architecture (ISA) bus or other bus architecture, if desired. An input/output (I/O) controller 185 couples a hard drive 190, a floppy drive 195 and a CD ROM drive 197 to expansion bus 180 as shown. I/O controller 185 includes a serial port 185A and a parallel port 185B. A speech synthesizer 198 and loudspeaker 199 can be coupled to ISA bus 180 to provide another way of communicating messages to the computer user. In this manner the message is acoustically annunciated to the computer user. Printers and other output devices can also be coupled to ISA bus 180 or PCI bus 155 to provide output to user messages.

A keyboard controller 135 is coupled to ISA bus 180 so that user input can be provided to computer 100. Keyboard controller 135 is a microcontroller which interfaces input devices such as keyboard 140 and a pointing device or mouse 145 to computer 100.

Basic Input/Output System (BIOS) software 200 is stored in BIOS ROM 102. In this particular embodiment, BIOS ROM 102 is coupled to ISA bus 180. As seen in FIG. 2, BIOS 200 includes a plurality of routines or modules. The terms "module" and "routine" are used interchangeably in this document. Some of the modules employed by BIOS 200 are conventional. For example, BIOS 200 includes conventional routines or modules such as an initialization module 205, an interrupt vector table 210, a keyboard I/O module 215, a disk I/O module 220 and a timer-timer I/O module 225. Initialization routine 205 is responsible for initializing computer 100 to a known state. Interrupt vector table 210 is a table of the starting addresses of each of the routines or modules of BIOS 200 such that the computer can readily execute a particular module when a corresponding software interrupt is received by the BIOS. Keyboard I/O module 215 controls the interaction of BIOS 200 with keyboard 140. Disk I/O module controls the interaction of BIOS 200 with hard disk 190, floppy disk 195 and CD ROM 197. The Timer-Timer I/O module controls the interaction of the BIOS with I/O controller 185, serial port 185A and parallel port 185B.

In addition to the conventional modules discussed above, BIOS 200 also includes a caller module 230, a message handler module 235 and a message storage area 240. The message storage area is separate from the caller module and the message handler module. The message handler module is separate from the caller module. Modules 230, 235 and 240 cooperate to bring messages to the user's attention. More particularly, while the BIOS is being executed as the computer operates, the BIOS often needs to inform the user that a particular event has occurred. The BIOS then issues a message to the user which is displayed on a monitor display 165, a panel display or other device for communicating the message to the user visually, verbally or otherwise.

The message includes a fixed textual portion and a plurality of message variables. For example, a message 300 such as the message string of FIG. 3A is stored in message storage area 240. Message 300 includes fixed text portions 305 and 310. Message 300 also includes variables 315 and 320 as shown. Variables 315 and 320 are numbered "n" wherein n=1 for variable 315 and n=2 for variable 320. More than 2 variables can be used in any particular message.

In variables 315 and 320, a "%" symbol indicates the start or beginning of the variable. FIG. 3B is a chart which shows different types of variables that are employed. In the chart of FIG. 3B, descriptor 325 denotes which type of message is to be displayed. The period symbol "." is employed as a separator 330 which separates descriptor 325 from the variable number 335. Other characters or character combinations may also be employed as separator 330.

Message 300 is stored in message storage area 240 along with a plurality of other messages which can be selected. A unique token, for example a number or character or character combination, is respectively associated with each message stored in message storage area 240. In this manner, the message caller module 230 can call up a particular message from message storage area 240 by passing the unique token associated with that message to the message handler module 235.

Caller module 230 then passes the message variables for the designated message to message handler 235 in a fixed order. In this particular example which calls up or retrieves a designated message 300, variable 315 (n=1) is first passed to message handler 235 and then variable 320 (n=2) is passed to message handler 235. Message handler module 235 is then responsible for interpreting the retrieved message string to determine how many variables are being supplied and where within the formatted output each variable is to be placed. Thus the final ordering of the message text which is displayed to the user is controlled by the stored message text string 300 itself.

As seen in message text string 300 of FIG. 3A, the fixed text "Memory failure at address" is displayed followed by variable 315 (n=1). (The term "fixed text" is used herein to mean positionally fixed within the message.) The displayed message then continues with the fixed text words "in location" followed by variable 320 (n=2). In this particular example, no reordering has occurred because the order in which the variables n=1 and n=2 were passed to the message handler is the same order in which the variables are ultimately displayed in the final message provided to the user's display 165.

In contrast, FIG. 3C is an example of a message 400 stored in memory storage area 240 wherein the stored message string reorders the variables which are supplied by the caller 230 to message handler 235. Message 400 includes fixed text portions 405 and 410. In this case, caller module 230 supplies the variables 315 and 320 to message handler module 235 in the same fixed order as described above with respect to message 300 of FIG. 3A. More particularly, when caller module 230 passes the token corresponding to message 400 to message handler module 235, the message handler module then calls up or retrieves message string 400 from message storage area 240. Variable 315 (n=1) is first passed to message handler 235 and then variable 320 (n=2) is then passed to message handler 235 as before. Again, the final ordering of the message variables within the message text displayed to the user is controlled by the stored message string 400 itself. As seen in message string 400 of FIG. 3C, the fixed text "Memory in location" is displayed followed by variable 320 (n=2). The displayed message is then continued with the fixed text words "failed at address" followed by variable 315 (n=1).

In this particular example, reordering of the message variables has occurred because the order in which the variables n=1 and n=2 are ultimately displayed in the final message provided to the user's display 165 is different from the order in which these variables were passed by the caller module to the message handler module. It is noted that fixed text portions 305 and 310 of message 300 of FIG. 3A are somewhat different than the fixed text portions 405 and 410 of FIG. 3C. For purposes of example, message 300 is designated as a reference U.S. English language message and message 400 is designated as a translated U.K language version of message 300. In actual practice, message 400 represents messages translated into languages other than U.K. English such as German, French, Spanish, Russian and so forth.

The computer arrangement described above provides significant advantages in terms of facilitating the development of versions of BIOS for different languages. Using the disclosed approach, it is significantly easier to write a BIOS in a first language such as U.S. English and to then adapt the BIOS to provide a version for another language. This is made possible because only the messages stored in the message storage area 240 of BIOS 200 must be translated. All of the other modules including the caller 230 and the message handler 235 remain substantially the same and are stored together as a fixed binary image 250 as indicated in FIG. 2. This fixed binary image 250 does not need to be translated when BIOS versions are developed from language to language. Rather, only the messages stored in message storage area 240 need translation.

This approach includes the second significant advantage that the messages stored in memory handling area 240 are configured to permit reordering of message variables by the message handler module. Such reordering of message variables is advantageously facilitated during translation of the messages in the message storage area at the time of BIOS development without altering the contents of fixed binary image 250. This is done by repositioning the location of the message variables within the message string stored in message area 240 for each message. Again, this reordering of the message variables is done without rewriting fixed binary image 250.

In actual practice, message storage area 240 includes a plurality of messages or message strings such as messages 300, 301, 302, . . . wherein each message corresponds to a unique token which is associated therewith. For example, the token associated with message 300 can be the character combination "MemMsg" or alternatively simply the number "1".

Figure 4:
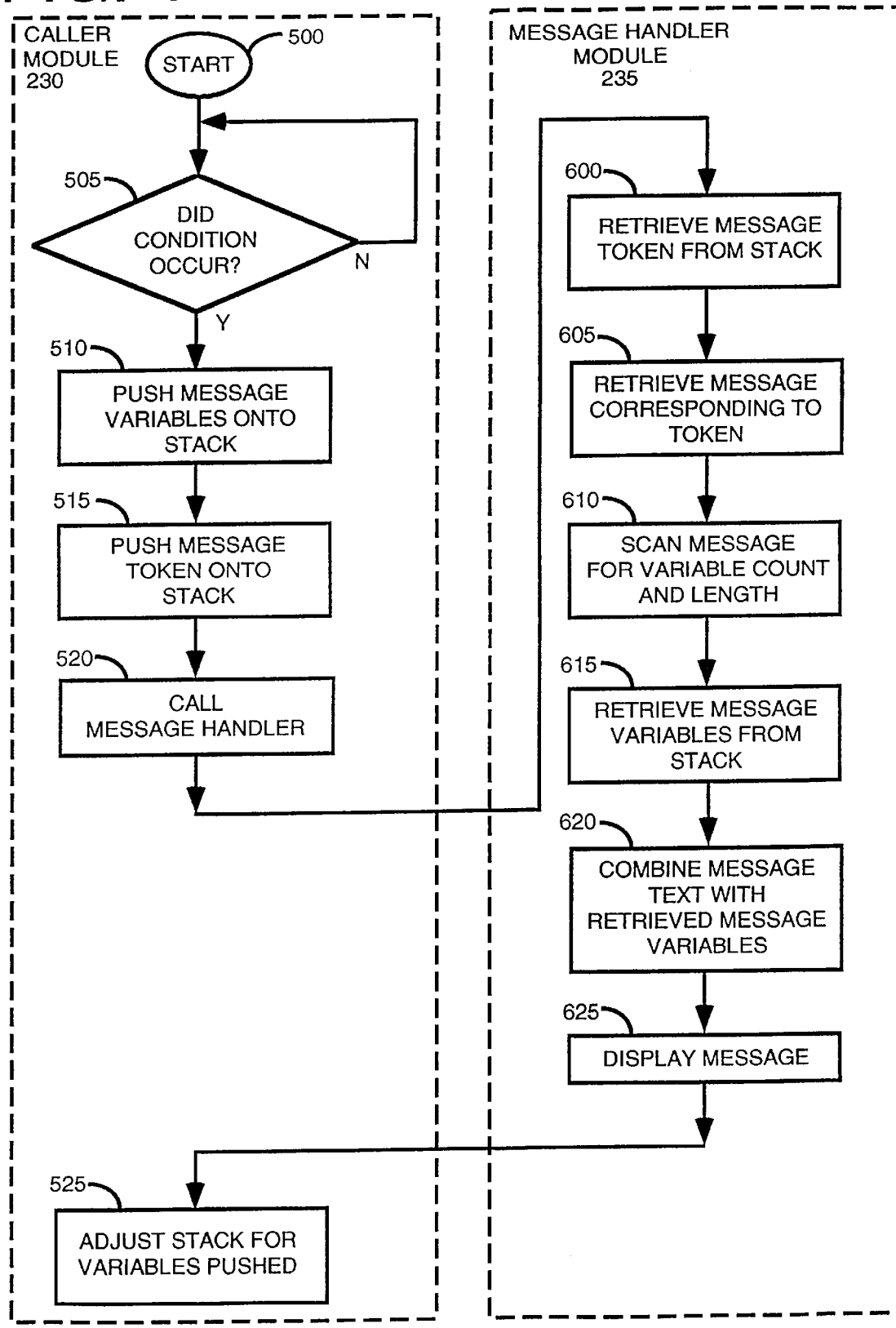
FIG. 4 is a flow chart depicting the operational flow of the message processing methodology employed by the BIOS of the computer system of FIG. 1.

FIG. 4 is a flow chart which illustrates the operation of caller module 230 and message handler module 235. After computer system 100 is initialized, process flow starts at start block 500 of caller module 230. A test is then conducted at decision block 505 to find out if a predetermined condition has occurred. For example, the BIOS tests to see if a memory fault or an alarm event has occurred. The BIOS can also test for numerous other conditions for which generating an informative message for the user is appropriate. A memory fault test is regarded as being illustrative of the many different types of tests that are possible. If the condition did not occur, then testing for the condition continues. However, for discussion purposes it is assumed that the condition has occurred and that it is desirable to issue a message to the user to inform the user about system status. In this example, the desired message includes 2 message variables and the token that corresponds to the message is the character combination MemMsg. As per block 510, the two message variables (memory address and memory location) are pushed onto a stack which is part of main memory 125. The message token is also pushed onto the stack as per block 515. It will be recalled that this message token corresponds to the particular one of the messages stored in message storage area 240 that the BIOS now wants to issue to the user. In this case, the particular message deals with the memory fault condition which has occurred. The caller module 230 now calls the message handler module 235 and passes control to that module as per block 520.

Message handler module 235 retrieves the message token from the stack as per block 600. Message handler module 235 then accesses message storage area 240 to retrieve the particular message string which corresponds to the retrieved message token as per block 605. Then message handler module 235 scans the message to determine the variable count and length as per block 610. For example, in the case where the token indicates that message 300 is to be retrieved, message handler 235 retrieves message string 300 from memory storage area 240. The BIOS then scans the retrieved message string and determines the number of message variables that it contains as per block 610. In this particular example, the BIOS determines that the designated message string contains two message variables. The length of the variables is also determined. In this particular case, %1x of the first variable 315 (n=1) indicates that a parameter or variable is coming which is a 4 byte long value to be printed in hexadecimal. (Refer to the chart of FIG. 3B.) The "h" after the "0.1" of first variable 315 is fixed text. With respect to the second variable 320 (n=2), the %s indicates that a parameter or variable is coming which points to a zero-terminated string (ie. an address where the variable is actually located). In this example, message string 300 is scanned from left to right to determine the variable count and variable length.

The message variables are then retrieved from the stack or other designated locations as per block 615. The retrieved message variables and the fixed message text (ie. the fixed textual portions) from message string 300 are then combined as per block 620 and displayed to the user as per block 625. In this case, the combined message which is displayed to the user would read "Memory failure at address 0x00010022 in location A1", for example. It is noted that while the term display is used here, the message can also be sent to a speech synthesizer 198 or other output device for communication to the user.

Message handler 235 then returns control to caller module 230. As per block 525, the caller module adjusts the stack to compensate for the message variables that were previously pushed.

For completeness, the case is now discussed wherein the messages in message storage area 240 have been translated and adapted for reordering the message variables as shown in the example of message 400 of FIG. 3C. In this case, the message token which calls for message 400 is retrieved from the stack as per block 600. The BIOS then retrieves the message string 400 which corresponds to the received token as per block 605. (It is noted that as in the example above with respect to message string 300, the BIOS has passed the first variable (n=1) and the second variable (n=2) in the same fixed order to the stack. Thus the BIOS has passed 4 bytes of address followed by 4 bytes of location as in the case of message 300 above.) At this point, the BIOS scans the message string for variable count and length as per block 610. The BIOS effectively performs a two pass scan of message string 400 to accomplish this task. In scanning message string 400 from left to right, the BIOS first encounters the second variable followed by the first variable. When the BIOS encounters the second variable, %s0.2, the BIOS is informed of a pointer on the stack which points to the address of a variable length zero terminated string. However, at this point the BIOS does not know precisely where on the stack the pointer is located since it does not yet know the size of the first variable which determines the location of the second variable on the stack. The BIOS continues scanning message string 400 and encounters the first variable %1x which indicates a 4 byte long hexadecimal number. Since the BIOS now knows the length of the first variable, it now also knows the location of the second variable which directly follows the first variable in the stack.

The BIOS retrieves the message variables from the stack or other designated locations as per block 615. The retrieved message variables and the fixed message text from message string 400 are then combined in the reordered manner indicated by message string 400 as per block 620. The reordered message is then displayed to the user as per block 625. In this case, the combined message which is displayed to the user would read "Memory in location A1 failed at address 0x00010022", for example.

While a computer system with a message variable value reordering capability is described above, a method of reordering message variables in a computer system is also disclosed. The computer system on which the method is practiced includes a microprocessor and a memory coupled to the microprocessor. The method includes the step of storing a message string including a fixed text portion and a plurality of message variables with order information in a memory storage area. The method also includes the step of supplying, by a caller module, of message variable values when a predetermined condition occurs. The method further includes the step of receiving, by a message handler module, the message variable values supplied by the caller module. The method also includes the step of retrieving, by the message handler module, of the message string in the message storage area as a retrieved message string, the message handler module reordering the message variable values if indicated by the order information of the retrieved message string. The method further includes the step of outputting the message variable values from the message handler module combined with the fixed text portion of the retrieved message string.

In another embodiment, a method of message processing is provided which includes the step of forming a message string which having a fixed text portion and a plurality of message variables with order information. The method includes the step of providing in a fixed order a plurality of message variable values corresponding to the plurality of message variables, respectively. The method also includes the step of reordering the plurality of message variable values according to the order information in the message string to provide a reordered plurality of message variable values. The method further includes the step of providing output to a message including a combination of the fixed text portion and the reordered plurality of message variable values.

The foregoing has described a computer apparatus and methodology which provides a message variable reordering capability. This feature makes it significantly easier to provide versions of the computer system adapted for different languages. In this manner, different versions of the computer are readily provided for each language which requires the message variables to be displayed in a different order than the original language, such as U.S. English, in which BIOS messages were originally written.

While only certain preferred features of the invention have been shown by way of illustration, many modifications and changes will occur. For example, while the particular embodiment discussed above uses the stack to pass message variables from caller module 230 to message handler module 235, it is noted that other embodiments of the invention are contemplated wherein a plurality of registers can be used to pass message variables from caller module 230 to message handler module 235. Moreover, one or more fixed textual portions can be included in a particular message string and two or more message variables can be included in a particular message string which employs the variable reordering feature described above. It is, therefore, to be understood that the present claims are intended to cover all such modifications and changes which fall within the true spirit of the invention.

I claim:

1. A computer system comprising:
   a processor;
   a main memory coupled to the processor;
   a message storage area for storing a message string including a fixed text portion and a plurality of message variables with order information;
   a caller module for supplying message variable values when a predetermined condition occurs;
   a message handler module for receiving message variable values from the caller module, the message handler module retrieving the message string from the message storage area as a retrieved message string, the message handler module reordering the message variable values if indicated by the order information of the retrieved message string; and
   an output device responsive to the message handler module for providing output to the message variable values from the message handler module combined with the fixed text portion of the retrieved message string.

2. The computer system of claim 1 wherein the caller module supplies the message variable values in a fixed order.

3. The computer system of claim 1 wherein the memory includes a stack and the caller module supplies the message variable values to the stack to permit the message handler module to retrieve the message variable values from the stack.

4. The computer system of claim 1 including a nonvolatile storage, coupled to the microprocessor, for storing a plurality of BIOS modules therein as a fixed binary image, the BIOS modules including the caller module and the message handler module.

5. The computer system of claim 1 wherein the output device comprises a graphics display.

6. The computer system of claim 1 wherein the output device comprises a speech synthesizer.

7. A computer system comprising:
   a processor;
   a main memory coupled to the processor;
   a message storage area for storing a plurality of message strings, each message string including a plurality of fixed text portions and a plurality of message variables with message variable order information;
   a caller module for determining if a predetermined condition occurs and in response supplying a token and a plurality of message variable values in a fixed order, the token designating one of the message strings in the message storage area as a designated message string;
   a message handler module for receiving the token and the plurality of message variable values supplied by the caller module, the message handler module retrieving the designated message string from the message storage area, the message handler module reordering the message variable values if indicated by the message variable order information of the designated message string; and
   an output device responsive to the message handler module for providing output to the message variable values from the message handler module combined with the fixed text portions of the designated message string.

8. The computer system of claim 7 wherein the caller module supplies the message variable values in a fixed order.

9. The computer system of claim 7 wherein the memory includes a stack and the caller module supplies the message variable values to the stack to permit the message handler module to retrieve the message variable values from the stack.

10. The computer system of claim 7 including a nonvolatile storage, coupled to the microprocessor, for storing a plurality of BIOS modules therein as a fixed binary image, the BIOS modules including the caller module and the message handler module.

11. The computer system of claim 7 wherein the output device comprises a graphics display.

12. The computer system of claim 7 wherein the output device comprises a speech synthesizer.

13. A method of processing messages in a computer system, the computer system including a microprocessor and a memory coupled to the microprocessor, the method comprising the steps of:
   storing a message string including a fixed text portion and a plurality of message variables with order information in a memory storage area;
   supplying, by a caller module, of message variable values when a predetermined condition occurs;
   receiving, by a message handler module, the message variable values supplied by the caller module,
   retrieving, by the message handler module, of the message string in the message storage area as a retrieved message string, the message handler module reordering the message variable values if indicated by the order information of the retrieved message string; and
   outputting the message variable values from the message handler module combined with the fixed text portion of the retrieved message string.

14. The method of claim 13 wherein in the supplying step the caller module supplies the message variable values in a fixed order.

15. The method of claim 13 wherein the memory includes a stack and in the supplying step the caller module supplies the message variable values to the stack.

16. The method of claim 15 wherein in the receiving step the caller module accesses the message variable values in the stack and receives the message variable values from the stack.

17. The method of claim 13 wherein the outputting step comprises displaying the message variable values from the message handler combined with the fixed text portion of the retrieved message string.

18. The method of claim 13 wherein the outputting step comprises acoustically annunciating the message variable values from the message handler combined with the fixed text portion of the retrieved message string.

19. The method of claim 13 further comprising the step of storing a plurality of BIOS modules in a nonvolatile storage as a fixed binary image, the BIOS modules including the caller module and the message handler module.

20. The method of claim 19 wherein in the storing step the message string is stored in a memory storage area separate from the fixed binary image.

21. The method of claim 19 further comprising the step of translating the message string from one language to another to produce a translated message string with reordered message variables.

22. The method of claim 21 further comprising the step of storing the translated message string in the message storage area without substantially altering the fixed binary image.

23. A method of processing messages in a computer system, the computer system including a microprocessor and a memory coupled to the microprocessor, the method comprising the steps of:

storing a plurality of message strings in a memory storage area, each message string including a plurality of fixed text portions and a plurality of message variables with message variable order information;

determining, by a caller module, if a predetermined condition occurs and in response supplying a token and a plurality of message variable values if the predetermined condition occurs, the plurality of message variable values being in fixed order, the token designating one of the message strings in the message storage area as a token designated message string;

receiving, by a message handler module, the message variable values and token supplied by the caller module thus providing received message variable values and a received token, retrieving, by the message handler module, of the token designated message string in the message storage area as a retrieved message string, the message handler module reordering the received message variable values if indicated by the order information of the retrieved message string; and outputting the received message variable values from the message handler module combined with the fixed text portions of the retrieved message string.

24. The method of claim 23 wherein the memory includes a stack and in the determining step the caller module supplies the message variable values to the stack.

25. The method of claim 24 wherein in the receiving step the caller module accesses the message variable values in the stack and receives the message variable values from the stack.

26. The method of claim 23 wherein the outputting step comprises displaying the message variable values from the message handler combined with the fixed text portion of the retrieved message string.

27. The method of claim 23 wherein the outputting step comprises acoustically annunciating the message variable values from the message handler combined with the fixed text portion of the retrieved message string.

28. The method of claim 23 further comprising the step of storing a plurality of BIOS modules in a nonvolatile storage as a fixed binary image, the BIOS modules including the caller module and the message handler module.

29. The method of claim 28 wherein in the storing step the message string is stored in a memory storage area separate from the fixed binary image.

30. The method of claim 28 further comprising the step of translating the plurality of message strings from one language to another prior to storage in the message storage area to produce a plurality of translated message strings with reordered message variables.

31. The method of claim 30 further comprising the step of storing the plurality of translated message strings in the message storage area without substantially altering the fixed binary image.

32. A method of message processing comprising the steps of:

forming a message string which includes a fixed text portion and a plurality of message variables with order information;

providing in a fixed order a plurality of message variable values corresponding to the plurality of message variables, respectively;

reordering the plurality of message variable values according to the order information in the message string to provide a reordered plurality of message variable values; and providing output to a message including a combination of the fixed text portion and the reordered plurality of message variable values.

33. A method of message processing comprising the steps of:

forming a message string which includes a plurality of fixed text portions and a plurality of message variables with order information;

providing in a fixed order a plurality of message variable values corresponding to the plurality of message variables, respectively;

reordering the plurality of message variable values according to the order information in the message string to provide a reordered plurality of message variable values; and providing output to a message including a combination of fixed text portions and the reordered plurality of message variable values.

* * * * *